United States Patent
Asai et al.

(10) Patent No.: US 6,536,386 B2
(45) Date of Patent: Mar. 25, 2003

(54) ASSIST GAS FUEL INJECTION MECHANISM FOR 2-CYCLE INTERNAL COMBUSTION ENGINE

(75) Inventors: Masahiro Asai, Saitama (JP); Yuji Marui, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/944,170

(22) Filed: Sep. 4, 2001

(65) Prior Publication Data

US 2002/0046716 A1 Apr. 25, 2002

(30) Foreign Application Priority Data

Sep. 4, 2000 (JP) ........................................ 2000-266498

(51) Int. Cl.[7] .............................................. F02B 33/04
(52) U.S. Cl. ................................................ 123/73 C
(58) Field of Search ........................... 123/73 C, 190.1, 123/80 BA, 80 BB

(56) References Cited

U.S. PATENT DOCUMENTS

| 4,696,263 A | * | 9/1987 | Boyesen | .................... 123/65 V |
| 4,926,705 A | * | 5/1990 | Morishita et al. | ...... 123/176.25 |
| 5,960,749 A | * | 10/1999 | Isomura et al. | ........... 123/73 C |
| 5,983,851 A | * | 11/1999 | Kimijima et al. | ...... 123/196 M |
| 6,308,677 B1 | * | 10/2001 | Bohach et al. | ........... 123/190.1 |

FOREIGN PATENT DOCUMENTS

JP         A10325323         12/1998

* cited by examiner

*Primary Examiner*—John Kwon
*Assistant Examiner*—Hyder Alt
(74) *Attorney, Agent, or Firm*—Birch, Stewart, Kolasch & Birch, LLP

(57) ABSTRACT

An assist gas fuel injection mechanism for a 2-cycle internal combustion engine includes a chamber communicated to a combustion chamber through a communicating passage. A rotary valve is provided in the communicating passage for controlling the opening and closing of the communicating passage. A fuel injection device is provided in the communicating passage between the rotary valve and the chamber. With this configuration, a highly compressed gas from the chamber, and fuel from the fuel injection device, are mixed with each other, and a concentrated mixture gas is supplied to the combustion chamber through the communicating passage. A protective layer is provided on the outside surface of the valve body of the rotary valve by using a material which is softer than the valve body of the rotary valve and the housing of the rotary valve and which is susceptible to plastic deformation.

20 Claims, 4 Drawing Sheets

ASSIST GAS FUEL INJECTION MECHANISM FOR 2-CYCLE INTERNAL COMBUSTION ENGINE

BACKGROUND OF THE INVENTION

1. Field of the Invention

The present invention relates to a rotary valve for mixture gas injection control which controls the opening and closing of a communicating passage communicating between a combustion chamber and a chamber, in an assist gas fuel injection mechanism of a 2-cycle internal combustion engine, and more particularly, to a protective layer applied to the surface of the rotary valve.

2. Description of the Background Art

The assist gas system fuel injection mechanism is a mechanism in which a highly compressed gas is reserved in a chamber provided adjacent to a combustion chamber, and a fuel is injected by using the highly compressed gas as an assist gas for formation of a mixture gas and for pushing out the mixture gas. As such a mechanism, there is known, for example, the one disclosed in Japanese Patent Laid-open No. Hei 10-325323.

As to a mixture gas injection control rotary valve in an assist gas system fuel injection mechanism applied to a 2-cycle internal combustion engine, hitherto, clearance has been set by giving priority to securing of gas-tightness under the most severe conditions through taking into consideration temperature rise due to receiving of heat during operation, dynamic strains and accuracy in production. Therefore, the clearance is somewhat large, the gas-tightness is lowered under other operating conditions, and it is necessary to increase the quantity of the fuel injection assist gas, so that the system must be larger in size.

In producing the rotary valve, the shape must be determined by taking into account the thermal strain and dynamic strain under operation, so that it has not been easy to produce the rotary valve. Further, where inappropriate clearance is generated due to dispersion of products arising from production errors, there is a possibility of the occurrence of seizure and adhesion due to the contact between the housing and the valve body, so that it has been necessary to enhance the accuracy in production, leading to difficulties of production and higher cost.

SUMMARY OF THE INVENTION

One problem to be solved in an assist gas fuel injection mechanism for a 2-cycle internal combustion engine is to reduce as much as possible the clearance between the valve body and the housing of a rotary valve, to reduce leakage of an injection assist gas, and to contrive a reduction in size of the assist gas fuel injection mechanism.

Another problem to be solved in an assist gas fuel injection mechanism for a 2-cycle internal combustion engine is to eliminate the necessity of high-accuracy working for fitting of the valve body of the rotary valve to the housing, to ensure that a minimum necessary minute clearance can be spontaneously formed during test running, and to enable inexpensive provision of parts.

Still another problem to be solved in an assist gas fuel injection mechanism for a 2-cycle internal combustion engine is to ensure that high durability can be obtained even where foreign matter has come into a sliding portion of the valve body.

The present invention, which has solved the above-mentioned problems, relates to an assist gas fuel injection mechanism for a 2-cycle internal combustion engine comprising a chamber communicated to a combustion chamber through a communicating passage, a rotary valve provided in the communicating passage for controlling the opening and closing of the communicating passage, and a fuel injection device provided in the communicating passage between the rotary valve and the chamber, such that a highly compressed gas from the chamber and a fuel from the fuel injection device are mixed with each other and supplied to the combustion chamber through the communicating passage.

The present invention provides a protective layer on an outside surface of a valve body of the rotary valve by using a material which is softer than the valve body of the rotary valve and a housing of the rotary valve and which is susceptible to plastic deformation.

In the assist gas fuel injection mechanism for a 2-cycle internal combustion engine as set forth above, a resin coating having a self-lubricating property may be used as the protective layer. Alternatively, a plating with a metal inactive to the material of the housing of the rotary valve may be used as the protective layer. Also, a composite plating having a self-lubricating property may be used as the protective layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 4A–4C show views of a valve body of a rotary valve used in the assist gas fuel injection mechanism, in which FIG. 4A is a side view, FIG. 4B is a vertical sectional view, and FIG. 4C is a sectional view taken along line X—X of FIG. 4A.

DETAILED DESCRIPTION OF THE PREFERRED EMBODIMENTS

Figure 1:
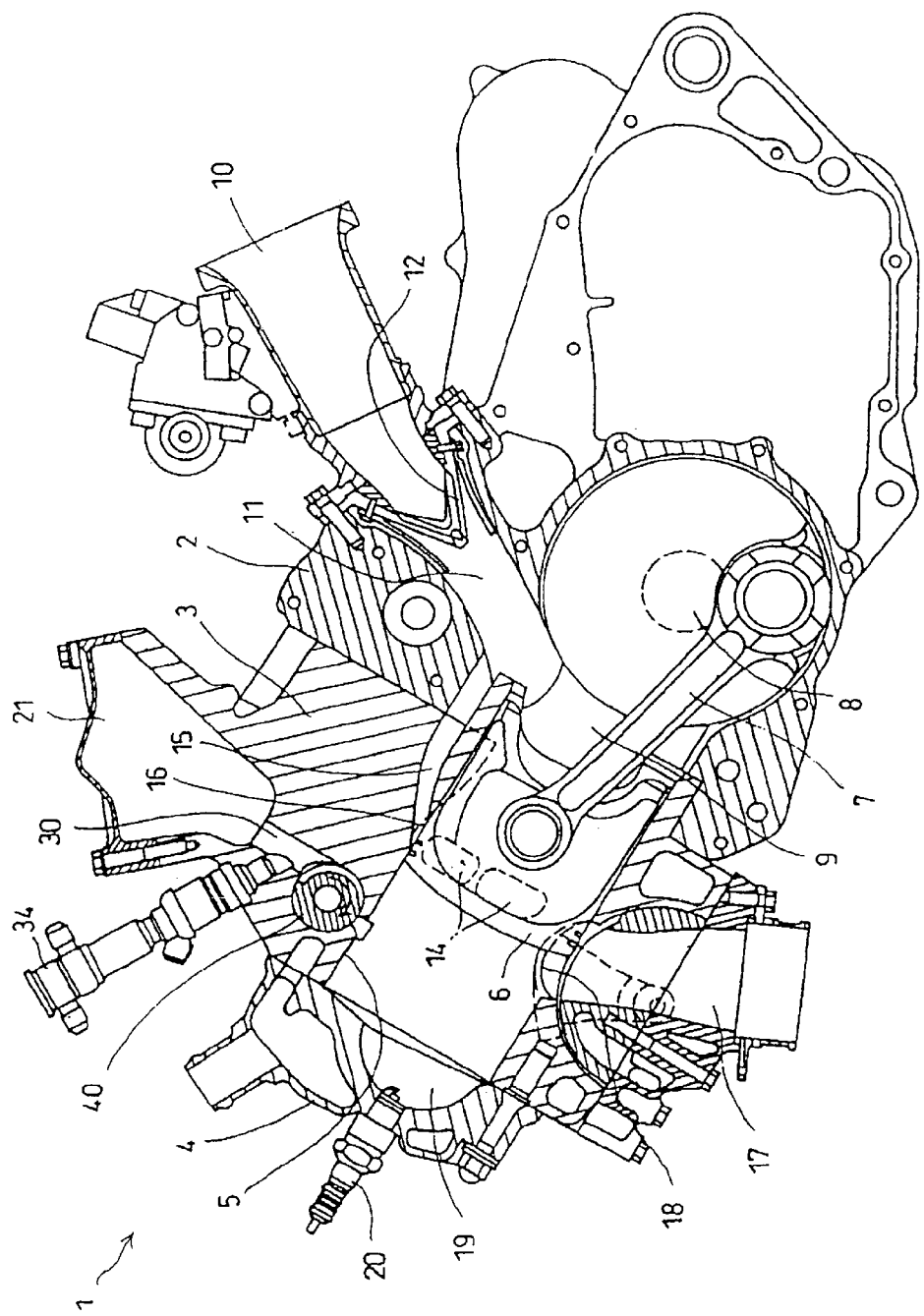
FIG. 1 is a vertical sectional view of a 2-cycle internal combustion engine equipped with an assist gas fuel injection mechanism.

Referring now to FIG. 1, a 2-cycle internal combustion engine 1 is mounted on a two-wheeled motor vehicle (not shown), in which a cylinder block 3 and a cylinder head 4 are sequentially laid on the upper side of a crankcase 2, and they are integrally connected to each other. A piston 6 is vertically slidably fitted in a cylinder 5 provided in the cylinder block 3. The piston 6 and a crankshaft 8 are connected to each other by a connecting rod 7, and the crankshaft 8 is driven to rotate by the upward and downward motions of the piston 6.

An intake passage 10 directed from the rear side toward the front side of the vehicle body is connected to an intake passage 11 in the crankcase 2. A throttle valve (not shown) in the intake passage 10 and a reed valve 12 in the intake passage 11 are disposed in series. The throttle valve is connected to a throttle grip (not shown) through connecting means (not shown) in such a manner that the opening of the throttle valve is increased when the throttle grip is twisted in one direction. An exhaust passage 17 having an exhaust port 18 is provided on one side of the circumferential direction of the cylinder block 3.

Figure 3:
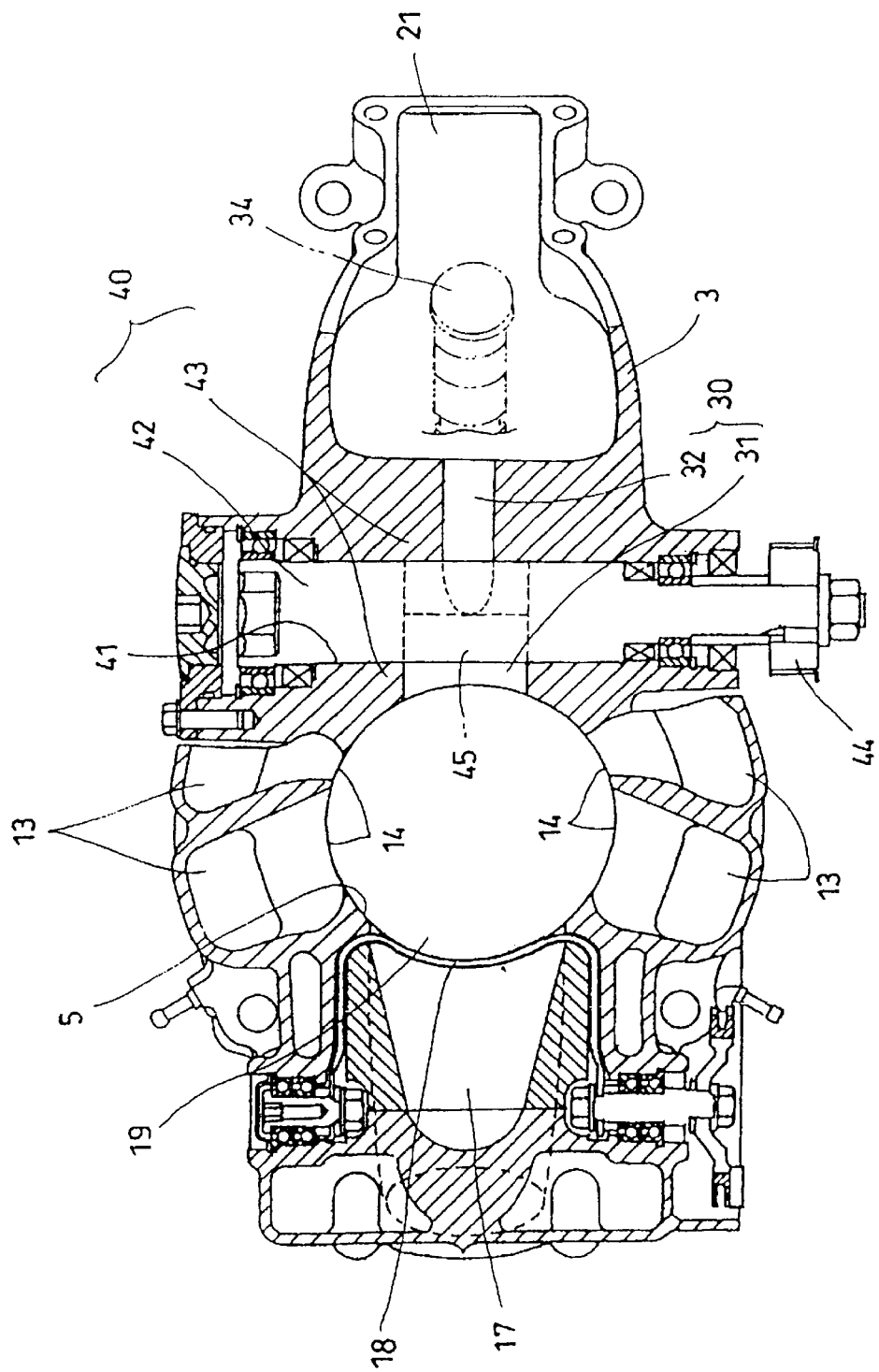
FIG. 3 is a horizontal sectional view of the internal combustion engine.

Referring to FIGS. 1 and 3, the crankcase 2 and the cylinder block 3 are provided with pairs of air supply scavenging passages 13 having scavenging ports 14 at left and right symmetrical positions with respect to a plane containing the exhaust port 18 and a cylinder center line, so as to communicate an upper portion of the cylinder 5 and a crank chamber 9 to each other. In addition, an air supply scavenging passage 15 having a scavenging port 16 is provided on the side of the cylinder opposite to the exhaust port 18. Namely, a total of five air supply scavenging passages are provided. The air supply scavenging passage 15 is directly connected to the intake passage 11 in the crankcase on the downstream side of the reed valve 12. A roughly hemispherical combustion chamber 19 on the upper side of the cylinder 5 is set off to be nearer to the exhaust port 18. The combustion chamber 19 is equipped with an ignition plug 20.

Figure 2:
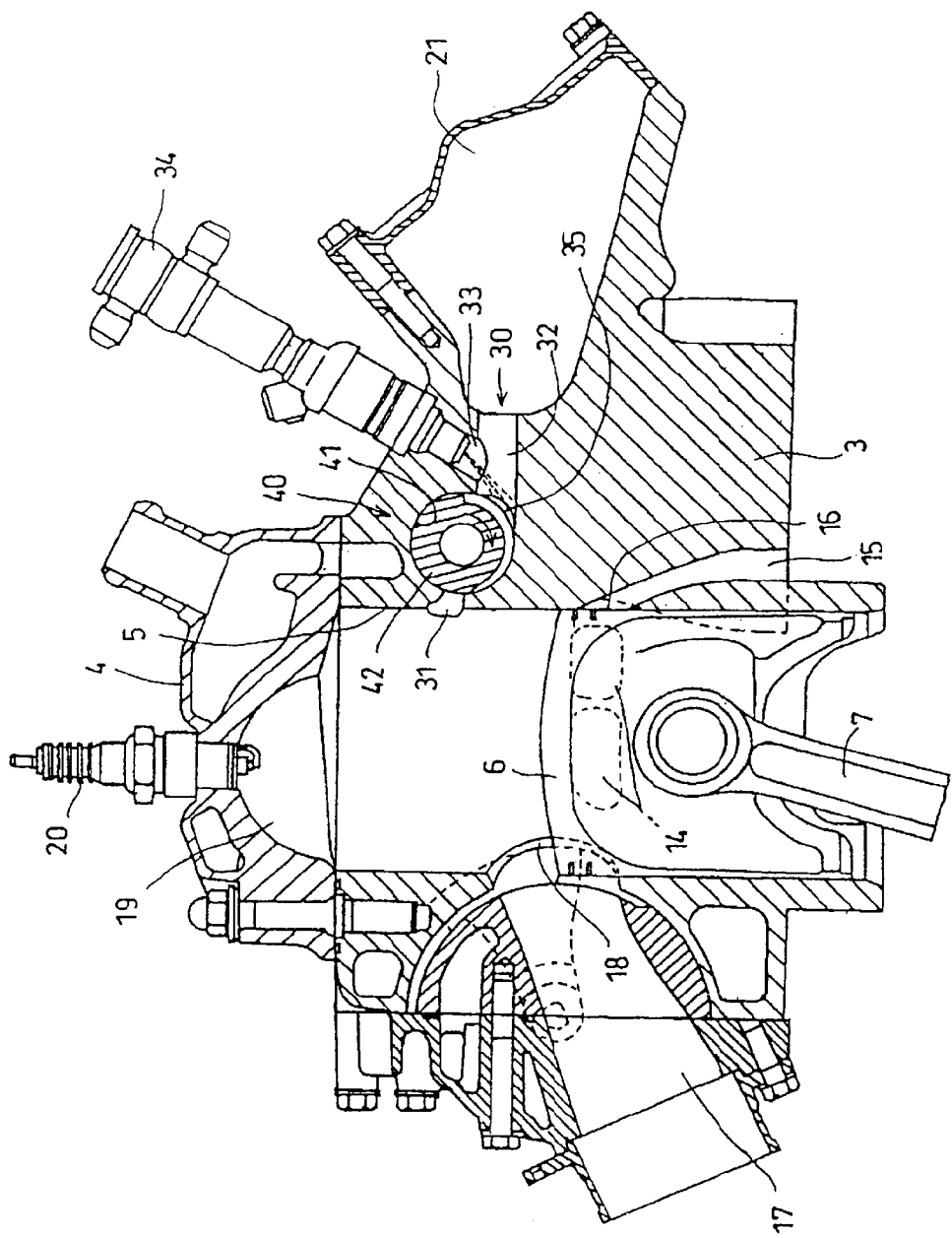
FIG. 2 is an enlarged vertical sectional view of a major part of the internal combustion engine.

Now, the assist gas system fuel injection mechanism will be described. In FIGS. 2 and 3, a chamber 21 is provided on the side of the cylinder block 3 farther from the exhaust passage 17. A communicating passage 30 for communicating an upper portion of the cylinder 5 and the chamber 21 to each other is provided. A rotary valve 40 is provided at an intermediate portion of the communicating passage 30 in the cylinder block 3. The rotary valve includes a valve containing hole 41 provided in the cylinder block and a valve body 42 rotatably fitted therein.

The communicating passage 30 is a common communicating passage such that a highly compressed gas flows therethrough from the combustion chamber 19 to the chamber 21, and a mixture gas and the highly compressed gas flow therethrough from the chamber 21 to the combustion chamber 19. The communicating passage 30 is constituted of a cylinder-side portion 31 and a chamber-side portion 32 with the rotary valve 40 therebetween. A fuel injection device 34 is connected to the chamber-side portion 32 of the communicating passage through a communicating passage 33 which is connected from a skew rear side.

A peripheral portion of the valve containing hole 41 is the cylinder block 3 itself, to which portion the cylinder-side portion 31 and the chamber-side portion 32 of the communicating passage are opened respectively on both sides of the valve containing hole 41, and these altogether constitute a housing 43 of the rotary valve. The valve body 42 of the rotary valve is driven to rotate in the opposite direction (clockwise in FIG. 1) to but at the same rotational speed with the crank shaft 8, by a transmission mechanism (not shown). Numeral 44 denotes a pulley which is fitted to one end of the valve body 42 of the rotary valve and around which the transmission mechanism (not shown) is wrapped.

Figure 4A:
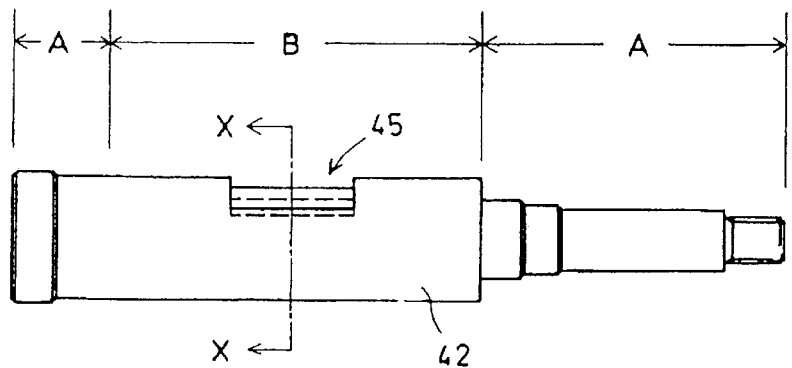
Figure 4B:
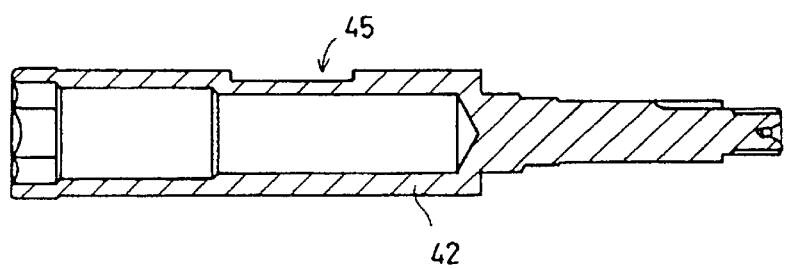
Figure 4C:
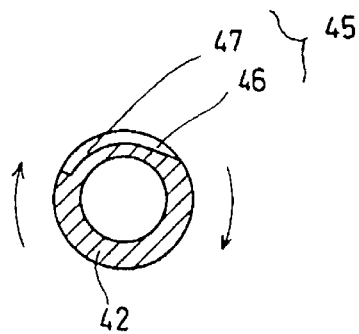

Referring now to FIGS. 4A–4C, the valve body 42 of the rotary valve is provided with a control valve groove 45. The valve groove 45 includes a front portion valve groove 46 and a rear portion valve groove 47 in connection from the forward side of the rotating direction. The front portion valve groove 46 is a portion for controlling the jet of a mixture gas from the chamber 21 to the combustion chamber 19, and the rear portion valve groove 47 is a portion for controlling the flow of a highly compressed gas from the combustion chamber 19 to the chamber 21.

Since the communicating passage 30 is a common communicating passage for both of the flows in the different directions, the changeover from the flow of the mixture gas at the time of opening of the front portion valve groove 46 to the flow of the highly compressed gas at the time of opening of the rear portion valve groove 47 depends on the balance between the pressure inside the combustion chamber 19 and the pressure inside the chamber 21. The flow inside the communicating passage 30 is changed over from the flow of the mixture gas to the flow of the highly compressed gas when the pressure inside the combustion chamber 19 exceeds the pressure inside the chamber 21. Substantially at this point of time, transition from the control of the flow of the mixture gas by the front portion valve groove 46 to the control of the flow of the highly compressed gas by the rear portion valve groove 47 takes place.

In FIG. 2, the portion with a crescent section denoted by symbol 35 is a fuel pool recessed portion provided on the cylinder block 3 side of the boundary between the inside wall of the communicating passage 30 and the outside peripheral surface of the valve body 42 of the rotary valve. With the recessed portion 35 thus provided, after the fuel injected from the fuel injection device 34 reaches the surface of the valve body 42 of the rotary valve until the front portion valve groove 46 is opened, the fuel is trapped in the fuel pool recessed portion 35, and, therefore, the fuel is assuredly supplied into the combustion chamber when the opening of the control valve is started.

Formation of the mixture gas is carried out in the following manner. The fuel injected from the fuel injection device 34 is jetted against the inside wall surface of the communicating passage at a boundary portion between the chamber-side portion 32 of the communicating passage 30 and the valve body 42 of the rotary valve, before the front portion valve groove 46 communicates the communicating passage 30. Next, when the front portion valve groove 46 communicates the communicating passage 30, the highly compressed gas charged in the chamber 21 flows in through the chamber-side portion 32 of the communicating passage 30, and is mixed with the fuel standing by to form a concentrated mixture gas, which is conveyed under pressure by the highly compressed gas in the chamber 21 and is injected through a cylinder-side port 31 of the communicating passage into the combustion chamber 19. Thereafter, when rotation of the rotary valve 42 proceeds and the rear portion valve groove 47 is in a position for communication of the communicating passage 30, a highly compressed gas is charged from the combustion chamber 19 into the chamber 21, to be utilized for the next injection of the fuel mixture gas.

In the present invention, in order to solve the items described above in the paragraphs of the problems to be solved, a protective layer constituted of a resin coating, metal plating or composite plating is provided on the surface of the valve body of the rotary valve. As a material for the valve body, a ferrous metal such as steels and carbon steel or a nonferrous metal such as aluminum alloys and titanium alloys may be used. As a material for the housing, aluminum alloys, cast iron and the like may be used.

Resin coating may provided by the use of a mixture of a polyamide-imide and molybdenum disulfide ($MoS_2$), or a mixture of a polyamide-imide and PTFE (tetrafluoroethylene). These materials are self-lubricating and are softer than the aluminum alloys, cast iron and the like used as the material of the housing. The thickness of the resin coating is suitably in the range of 5 to 50 μm. The baking temperature is 240 to 250° C. Shot peening or alodine treatment is carried out as a substrate treatment, whereby the peel strength of the resin coating is enhanced, and high durability is displayed.

Metal plating may be provided by silver plating or tin plating. These platings are softer than the aluminum alloys and cast iron used as the material of the housing, and are inactive to the housing materials. The thickness of the plating is suitably in the range of 5 to 50 μm.

Composite plating may be provided by use of a mixture of Ni—P (solid solution of phosphorus in a matrix of nickel) and PTFE. This material is self-lubricating. The hardness is HMV (25 g) 400 to 900. The thickness of the plating is suitably in the range of 5 to 50 μm.

The above-mentioned protective layer may be applied by selecting one type from the above-mentioned materials and methods and be applied uniformly to the surface of the valve body, or may be applied by setting a plurality of object areas and by selecting different materials or methods. As an example, in FIG. 4A, the composite plating by use of Ni—P and PTFE may be applied to the surfaces A of both end portions of the valve body, while the resin coating by use of a mixture of the polyamideimide and molybdenum disulfide ($MoS_2$) may be applied to the surface B of a central portion of the valve body which mainly consists of the valve groove 45. Alternatively, the composite plating may be applied to the whole surface of the valve body.

While the rotary valve 40 has been described to be used for both control of the supply of the concentrated mixture gas from the chamber 21 to the combustion chamber 19 and control of the charging of the highly compressed gas from the combustion chamber 19 into the chamber 21, separate rotary valves may be provided for the respective controls. A rotary valve for only one of the controls may also be used. In that case, for example, a highly compressed gas is supplied into the chamber 21 by use of a separately provided pump or the like, and the rotary valve 40 controls only the supply of the concentrated mixture gas from the chamber 21 to the combustion chamber 19. In this case, the degree of freedom in laying out the communicating passage 30 and the cylinder-side portion 31 of the communicating passage is increased.

By the self-lubricating property of the surface treatment, the clearance between the valve body 42 and the valve containing hole 41 of the housing of the rotary valve 40 can be set to be not more than the clearance needed for obviating contact, the leakage of the assist gas for injection can be reduced, and the size of the assist gas fuel injection mechanism can be reduced.

Since a surface treatment layer which is soft and susceptible to plastic deformation is provided, there is no need for high accuracy for fitting, the clearance between the valve body 42 and the valve containing hole 41 of the housing of the rotary valve 40 is spontaneously adjusted during a test running, and a minimum required clearance is thereby provided, so that parts can be provided inexpensively.

Even when foreign matter enters between the valve body 42 and the valve containing hole 41, the foreign matter is embedded into the surface treatment layer and, therefore, does not affect other parts, so that a product which is high in durability and reliability can be provided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An assist gas fuel injection mechanism for a 2-cycle internal combustion engine, comprising:

a chamber communicated to a combustion chamber through a communicating passage;

a rotary valve provided in said communicating passage for controlling the opening and closing of said communicating passage; and a fuel injection device provided in said communicating passage between said rotary valve and said chamber, such that a highly compressed gas from said chamber and fuel from said fuel injection device are mixed together and supplied to said combustion chamber through said communicating passage, wherein a protective layer is provided on an outside surface of a valve body of said rotary valve by using a material which is softer than said valve body of said rotary valve and a housing of said rotary valve and which is susceptible to plastic deformation, said outer surface being treated by a shot peening process or an alodine treatment to enhance peel strength and durability of said protective layer.

2. The assist gas fuel injection mechanism for a 2-cycle internal combustion engine as set forth in claim 1, wherein a self-lubricating resin coating is used as said protective layer.

3. The assist gas fuel injection mechanism for a 2-cycle internal combustion engine as set forth in claim 1, wherein a plating with a metal inactive to the material of said housing of said rotary valve is used as said protective layer.

4. The assist gas fuel injection mechanism for a 2-cycle internal combustion engine as set forth in claim 1, wherein a composite self-lubricating plating is used as said protective layer.

5. An internal combustion engine, comprising:

a cylinder block;

a combustion chamber provided in said cylinder block;

an auxiliary chamber provided adjacent to said combustion chamber;

a passageway interconnecting said combustion chamber with said auxiliary chamber;

a rotary valve provided in said passageway for controlling the opening and closing of said passageway, said rotary valve including a valve body;

a fuel injection device provided in said passageway between said rotary valve and said auxiliary chamber; and a protective layer provided on an outer surface of said valve body, said protective layer comprising a material which is softer than said valve body and said cylinder block, said outer surface being treated by a shot peening process or an alodine treatment to enhance peel strength and durability of said protective layer.

6. The internal combustion engine as set forth in claim 5, wherein said material is susceptible to plastic deformation.

7. The internal combustion engine as set forth in claim 5, wherein said material has a thickness in a range of from 5 to 50 μm.

8. The internal combustion engine as set forth in claim 5, wherein said material is bonded to said valve body.

9. The internal combustion engine as set forth in claim 5, wherein said material is a resin coating.

10. The internal combustion engine as set forth in claim 9, wherein said resin coating is a mixture of a polyamide-imide and molybdenum disulfide.

11. The internal combustion engine as set forth in claim 9, wherein said resin coating is a mixture of a polyamide-imide and polytetrafluoroethylene.

12. The internal combustion engine as set forth in claim 5, wherein said material is a metal plating.

13. The internal combustion engine as set forth in claim 12, wherein said metal plating is a silver plating.

14. The internal combustion engine as set forth in claim 12, wherein said metal plating is a tin plating.

15. The internal combustion engine as set forth in claim 5, wherein said material is a composite plating.

16. The internal combustion engine as set forth in claim 15, wherein said composite plating is a solid solution of phosphorus in a matrix of nickel.

17. The internal combustion engine as set forth in claim 5, wherein said material includes a first substance located on a first portion of said valve body, and a second, different substance located on a second portion of said valve body.

18. The internal combustion engine as set forth in claim 17, wherein said first substance and said second substance are selected from the group consisting of a resin coating, a metal plating, and a composite plating.

19. An internal combustion engine, comprising:

a cylinder block;

a combustion chamber provided in said cylinder block;

an auxiliary chamber provided adjacent to said combustion chamber;

a passageway interconnecting said combustion chamber with said auxiliary chamber;

a rotary valve provided in said passageway for controlling the opening and closing of said passageway, said rotary valve including a valve body;

a fuel injection device provided in said passageway between said rotary valve and said auxiliary chamber; and a protective layer provided on an outer surface of said valve body, said protective layer comprising a material susceptible to plastic deformation and which is softer than said valve body and said cylinder block, said material being bonded to said valve body and having a thickness of from 5 to 50 $\mu$m, wherein said outer surface is treated by a shot peening process or an alodine treatment to enhance peel strength and durability of said protective layer.

20. The internal combustion engine as set forth in claim 19, wherein said material is selected from the group consisting of a resin coating, a metal plating, and a composite plating.

* * * * *